US008832731B1

(12) United States Patent
Sennett et al.

(10) Patent No.: US 8,832,731 B1
(45) Date of Patent: Sep. 9, 2014

(54) MULTIPLE LANGUAGE EMERGENCY ALERT SYSTEM MESSAGE

(75) Inventors: DeWayne Allan Sennett, Redmond, WA (US); Brian Kevin Daly, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 677 days.

(21) Appl. No.: 11/695,843

(22) Filed: Apr. 3, 2007

(51) Int. Cl.
*H04N 7/10* (2006.01)
*H04N 7/025* (2006.01)

(52) U.S. Cl.
USPC ............................................................ 725/33

(58) Field of Classification Search
CPC ............ H04N 21/814; H04N 21/4856; H04N 21/8106; H04N 21/83555; H04N 21/8543
USPC ......... 725/78, 81, 143, 33, 20, 134, 142, 133, 725/32, 40, 23, 46; 384/6, 9; 379/88.01
See application file for complete search history.

(56) References Cited

U.S. PATENT DOCUMENTS

| | | | | |
|---|---|---|---|---|
| 5,635,657 A | * | 6/1997 | Lee et al. | 84/610 |
| 5,825,407 A | * | 10/1998 | Cowe et al. | 725/143 |
| 6,233,317 B1 | * | 5/2001 | Homan et al. | 379/88.05 |
| 6,944,464 B2 | * | 9/2005 | Muranaga | 455/456.1 |
| 2001/0030710 A1 | * | 10/2001 | Werner | 348/467 |
| 2002/0002464 A1 | * | 1/2002 | Petrushin | 704/275 |
| 2002/0111792 A1 | * | 8/2002 | Cherny | 704/8 |
| 2003/0093187 A1 | * | 5/2003 | Walker | 701/1 |
| 2007/0004377 A1 | * | 1/2007 | Medford et al. | 455/404.1 |
| 2008/0072322 A1 | * | 3/2008 | Guruswamy | 726/22 |

FOREIGN PATENT DOCUMENTS

WO WO 01/47286 * 6/2001 ............ H04N 71/73

* cited by examiner

*Primary Examiner* — Nasser Goodarzi
*Assistant Examiner* — An Nguyen
(74) *Attorney, Agent, or Firm* — Baker & Hostetler LLP

(57) ABSTRACT

An Emergency Alert System (EAS) alert message is distributed in multiple languages. The multiple language EAS alert message can be provided via a single channel and/or multiple channels. The multiple language EAS alert message can be provided with a language vector indicating the languages provided and the location of respective language specific EAS alert messages. A mobile device receiving the multiple language EAS alert message, selects a preferred language specific EAS alert message and renders the EAS alert message in the preferred language.

19 Claims, 10 Drawing Sheets

MULTIPLE LANGUAGE EMERGENCY ALERT SYSTEM MESSAGE

TECHNICAL FIELD

The technical field generally relates to communications systems and more specifically relates to the broadcast of Emergency Alert System (EAS) messages. Even more specifically, the technical field relates to providing EAS messages in multiple languages.

BACKGROUND

The wireless Emergency Alert System (EAS) is capable of providing messages indicative of a variety of types of alerts. Via the EAS, subscribers thereof can receive messages pertaining to weather conditions, disasters, AMBER (America's Missing: Broadcast Emergency Response) alerts, and/or alerts issued by the Government, for example. Currently, EAS alert messages are envisioned to be provided in English. Areas exist, however, having more than one predominant language. Also, areas exist having a large variety of international travelers. Thus, some subscribers may prefer an EAS alert message in another language.

SUMMARY

Wireless Emergency Alert System (EAS) alert messages are provided, to a mobile device, in multiple languages. In various configurations, multi-language EAS alert messages are provided via separate channels, via a single channel, or a combination thereof. Additionally, multi-language EAS alert messages can comprise vectors indicating the languages provided and the location of respective EAS alert messages.

BRIEF DESCRIPTION OF THE DRAWINGS

The foregoing and other objects, aspects and advantages of multi-language EAS alert messages will be better understood from the following detailed description with reference to the drawings.

DETAILED DESCRIPTION OF ILLUSTRATIVE EMBODIMENTS

Emergency Alert System (EAS) alert messages are broadcast in multiple languages. In an example embodiment, an EAS alert message is provided, to a mobile device, in several languages, via a single channel. In another example embodiment, an EAS alert message is provided, to a mobile device, in several languages, via multiple, respective, channels. In yet other example embodiments, an EAS alert comprises an wireless EAS language vector. The vector identifies the type of alert, the languages in which the alert message is being broadcasted, the channel corresponding to a language, or a combination thereof.

The term channel as used herein refers to partitioning of a delivery technology for the support of multi-language wireless EAS alerts. The partitioning can be logical (e.g., comprising a message ID and/or a message tag), the partitioning can be physical (e.g., different frequency bands), or a combination thereof.

Figure 1:
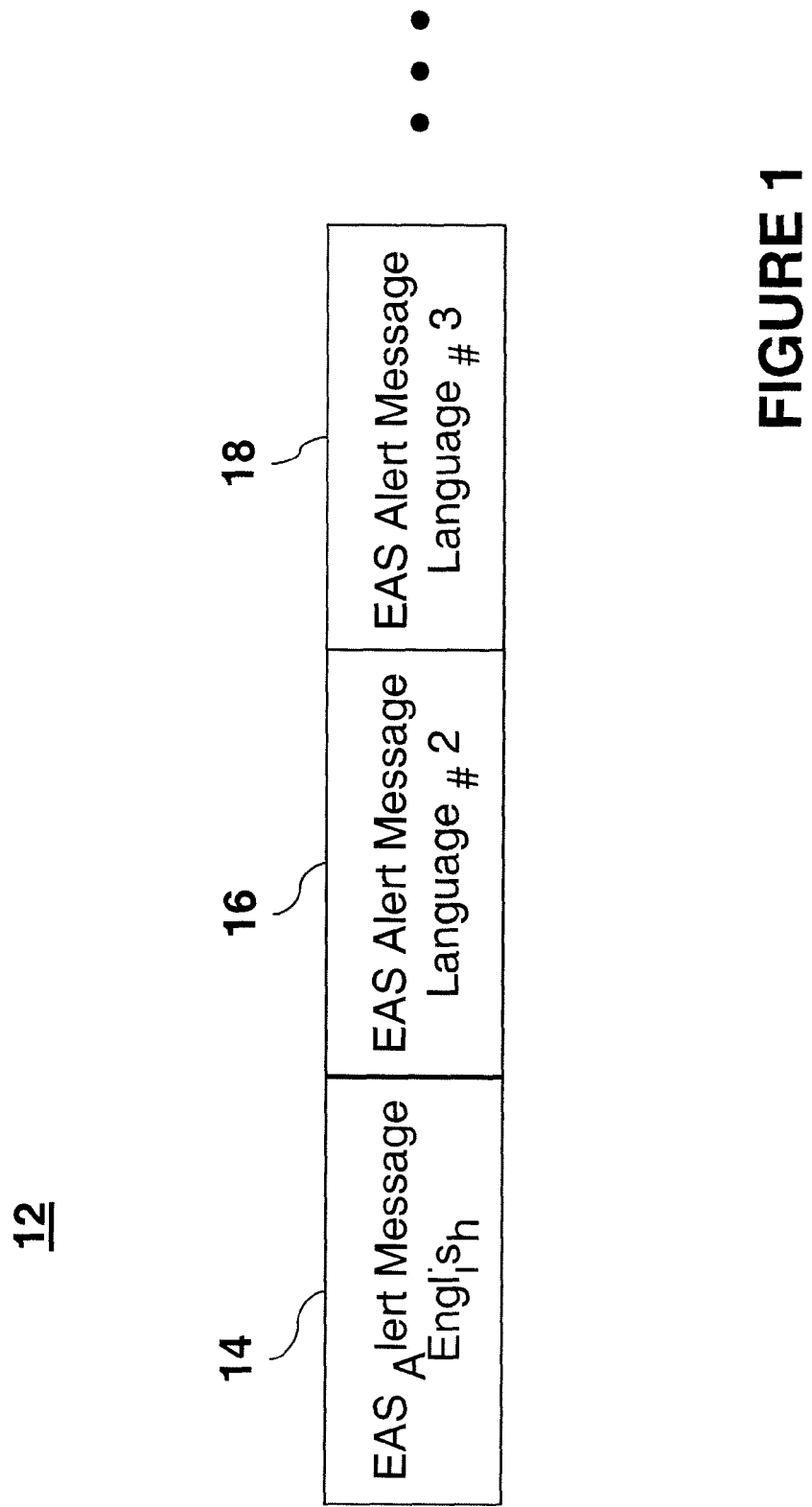
FIG. 1 is an example depiction of a wireless multiple language EAS alert message provided via a single channel.

FIG. 1 is an example depiction of a wireless multiple language EAS alert message provided via a single channel 12. The multiple language EAS alert message comprises language specific alert messages 14, 16, and 18. Each language specific alert message 14, 16, 18 comprises the alert message in a predetermined language. Language specific alert messages 14, 16, 18, are provided to a mobile device, or the like, by interleaving the language specific messages 14, 16, 18, of the wireless alert message onto a single channel 12. It is to be understood that the depiction in FIG. 1 of three languages is exemplary, and is not limited thereto. The EAS alert message can be provided in any number of languages, via the single channel 12.

In an example configuration, the English version of the wireless EAS alert message 14 is sent first, followed by the EAS alert message in other languages, 16, 18. After the wireless alert message has been sent in each of the languages supported for the specific EAS alert, the entire sequence 14, 16, 18, is be repeated (rebroadcast) starting again with the English version 14 of the wireless alert.

Each of the multiple language EAS alert messages 14, 16, 18, can be the same size or different sizes. For example, each of the multiple language EAS alert messages 14, 16, 18, can be configured to comprise an equal number of bytes, or varying numbers of bytes, dependent upon the alert message. Each of the multiple language EAS alert messages 14, 16, 18, can comprise textual information, audio information, video information, multimedia information, or a combination thereof. The mobile device configured to receive multiple language wireless EAS alert messages can be preconfigured with channel assignment information for the multiple language wireless EAS alert messages. For example, a mobile device can be configured by a manufacturer, supplier, retailer, and/or subscriber, of the mobile device, with information pertaining to the channel via which multiple language wireless EAS alert messages will be provided.

The mobile device configured to receive multiple language EAS alert messages may not know, a priori, if an EAS alert message will be provided in a specific language. For example, a mobile device may not know, before an EAS alert message is received by the mobile device, if the EAS alert message will be provide in French. Accordingly, in one example embodiment, the EAS alert message is rendered on the mobile device first in a default language, such as English, and subsequently rendered, when received, in the preferred language as configured on the mobile device. In another example embodiment, the mobile device waits until at least one complete cycle of transmissions of the wireless multiple language EAS alert messages has occurred to determine if the wireless alert will be transmitted in the preferred language of the mobile device user. If the wireless alert message is detected in the mobile device user's preferred language, the wireless alert message is rendered on the mobile device in the preferred language. If the wireless alert message in the preferred language is not found, the mobile device will detect and render the next retransmission of the default language (e.g., English) version of the wireless alert message.

Figure 2:
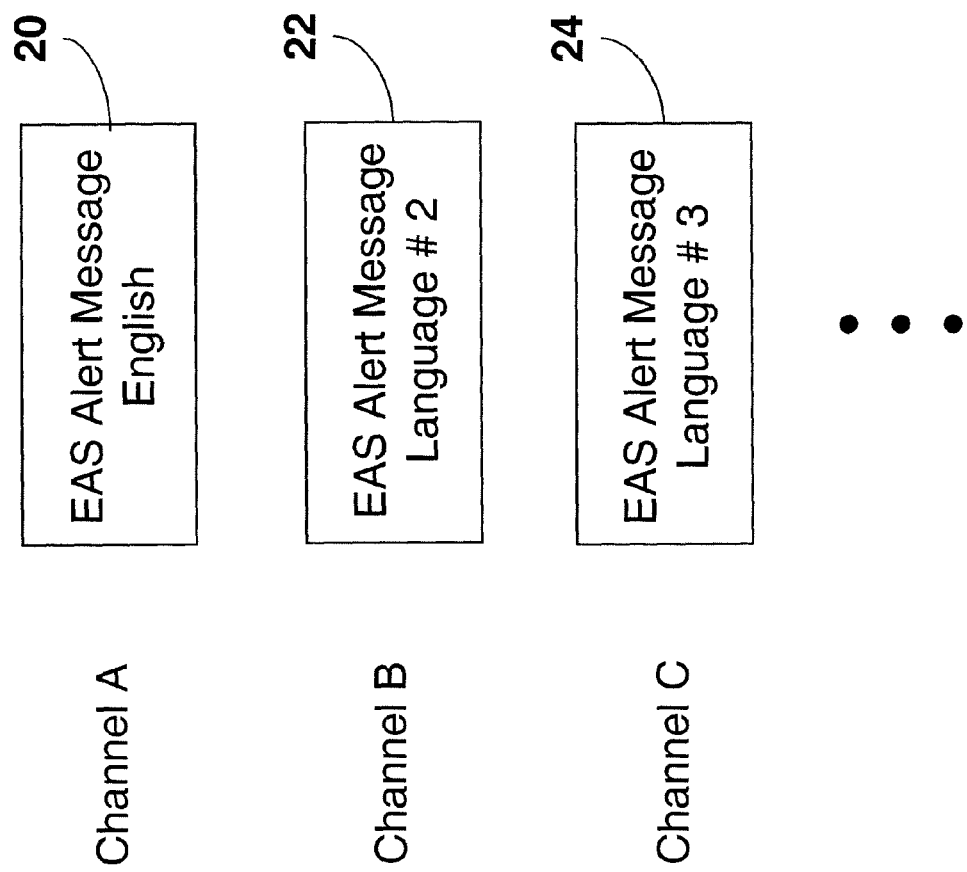
FIG. 2 is an example depiction of a wireless multiple language EAS alert provided via a multiple channels.

FIG. 2 is an example depiction of a wireless multiple language EAS alert provided via a multiple channels. In an example embodiment, wireless multiple language specific EAS alert messages 20, 22, 24, are provided to a mobile device or the like, via respective channels A, B, C, for each language version of the wireless alert. Transmission of a wireless alert message in a specific language is accomplished via a respective, separate, channel assigned thereto. Because wireless multiple language EAS alert messages are provided on separate channels, the wireless multiple language EAS alert messages can be provided concurrently. A retransmission of a wireless EAS alert message for each language can be performed separately and independently.

Each of the language specific EAS alert messages 20, 22, 24, can be the same size or different sizes. For example, each of the language specific EAS alert messages 20, 22, 24, can be configured to comprise an equal number of bytes, or varying numbers of bytes, dependent upon the alert message. Each of the language specific EAS alert messages 20, 22, 24, can comprise textual information, audio information, video information, multimedia information, or a combination thereof. The mobile device configured to receive multiple language wireless EAS alert messages can be preconfigured with channel assignment information for the multiple language wireless EAS alert messages. For example, a mobile device can be configured by a manufacturer, supplier, retailer, and/or subscriber, of the mobile device, with information pertaining to each channel via which a respective language version of the wireless EAS alert message will be provided.

As described above, the mobile device configured to receive multiple language EAS alert messages may not know, a priori, if an EAS alert message will be provided in a specific language. Accordingly, in one example embodiment, the EAS alert message is rendered on the mobile device first in a default language, such as English, and subsequently rendered, when received, in the preferred language as configured on the mobile device. In another example embodiment, the mobile device waits until at least one complete cycle of transmissions of the wireless multiple language EAS alert messages has occurred to determine if the wireless alert will be transmitted in the preferred language of the mobile device user. If the wireless alert message is detected in the mobile device user's preferred language, the wireless alert message is rendered on the mobile device in the preferred language. If the wireless alert message in the preferred language is not found, the mobile device will detect and render the next retransmission of the default language (e.g., English) version of the wireless alert message.

Figure 3:
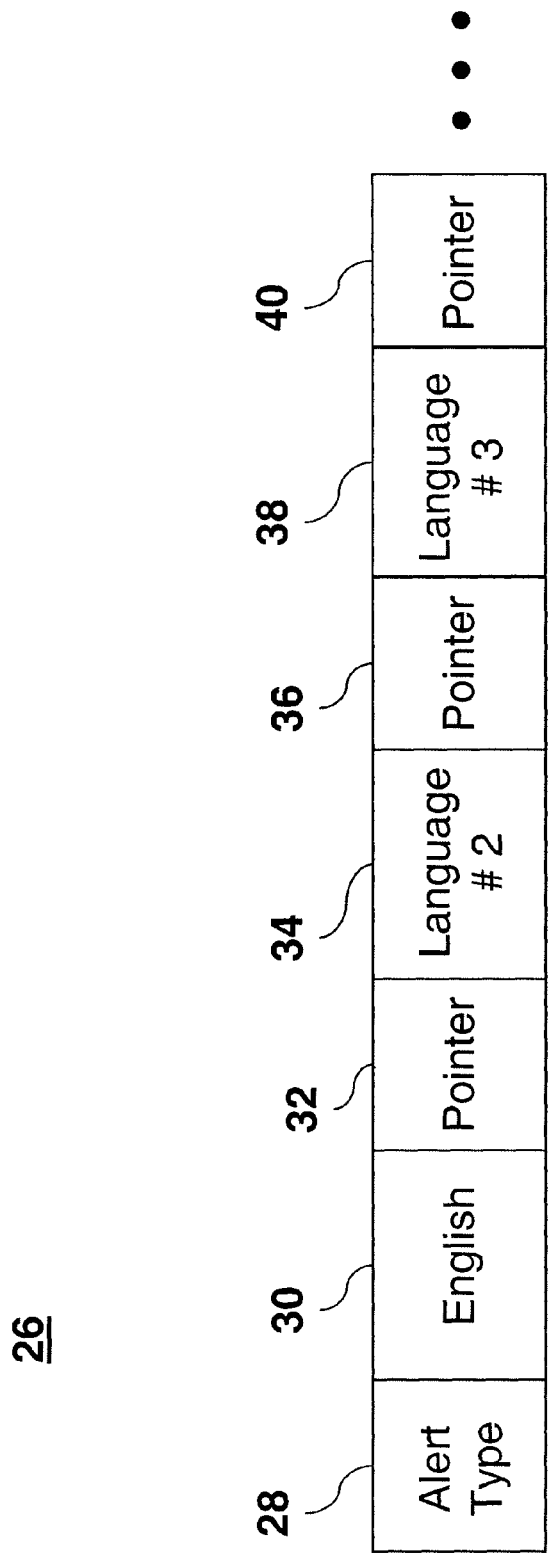
FIG. 3 depicts an example wireless EAS language vector.

FIG. 3 depicts an example wireless EAS language vector 26. In an example embodiment, the wireless EAS language vector 26 is utilized in conjunction with the above described multiple language wireless EAS alert messages. The wireless EAS language vector 26 comprises an optional EAS alert type indicator portion 28, a language indicator portion 30, 34, 38, and pointer portions 32, 36, 40 for each respective language version of the EAS alert message.

In an example embodiment, each wireless EAS language vector 26 comprises one alert type portion 28 that indicatives the type of alert, such as for example, weather, AMBER, government issued, geophysical e.g., landslide, meteorological, e.g., flood, general emergency and public safety, law enforcement, military, homeland and local/private security, rescue and recovery, fire suppression and rescue, medical and public health, pollution and other environmental conditions, public and private transportation, utility, telecommunication, other non-transport infrastructure, CBRNE (Chemical, Biological, Radiological, Nuclear or Explosive) threat or attack, and/or system test, or other type of alert. The type of alert can be indicated in any appropriate manner, such as a textual indication of the alert, a type ID, or a combination thereof. And, in this example embodiment, each wireless EAS language vector 26 comprises a plurality of paired portions 30/32, 34/36, 83/40, indicating a language type and a respective channel of the EAS alert message formatted in the respective language. Any appropriate number of languages and respective pointers can be included in the wireless EAS language vector 26.

Figure 4:
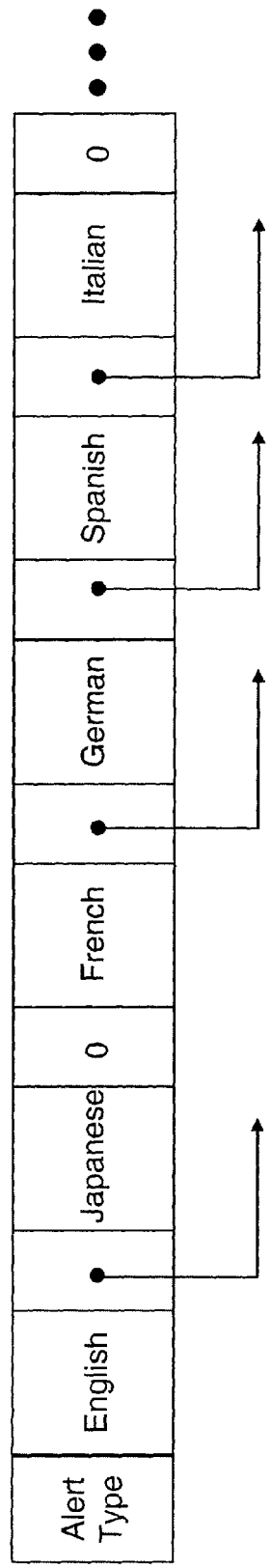
FIG. 4 is another depiction of an example wireless EAS language vector.

In an example embodiment, as depicted in FIG. 4, for languages in which the EAS alert message is available, pointer information to the associated channel for that specific language version is provided. For languages that are not available for a specific wireless alert, the pointer portion comprises an indication thereof, such as a zero, null, or any other appropriate value. As depicted in FIG. 4, there are no Japanese or Italian versions of the EAS alert message, and the English, French, German, and Spanish versions of the EAS alert message are available.

A wireless EAS language vector can be predefined and pre-provisioned in a mobile device, a wireless EAS language vector can be provided with each wireless EAS alert broadcast, or a combination thereof. A predefined wireless EAS language vector can be pre-provisioned on a mobile device. The mobile device configured to receive multiple language wireless EAS alert messages can be preconfigured with an EAS language vector configured in accordance with a predefined set of languages that will be supported for all wireless EAS alerts. In an example embodiment, all wireless EAS alert messages are transmitted in all of the predefined set of languages. For example, a mobile device can be configured by a manufacturer, supplier, retailer, and/or subscriber, of the mobile device, with the wireless EAS language vector. Updates to the predefined wireless EAS language vector can be performed via over the air provisioning techniques, or any other appropriate technique. When a subscriber roams into the serving area of another wireless operator, the subscriber's mobile device is updated with the appropriate predefined wireless EAS language vector. Updates could be performed with over the air provisioning techniques when the mobile device registers on the visiting system.

Figure 5:
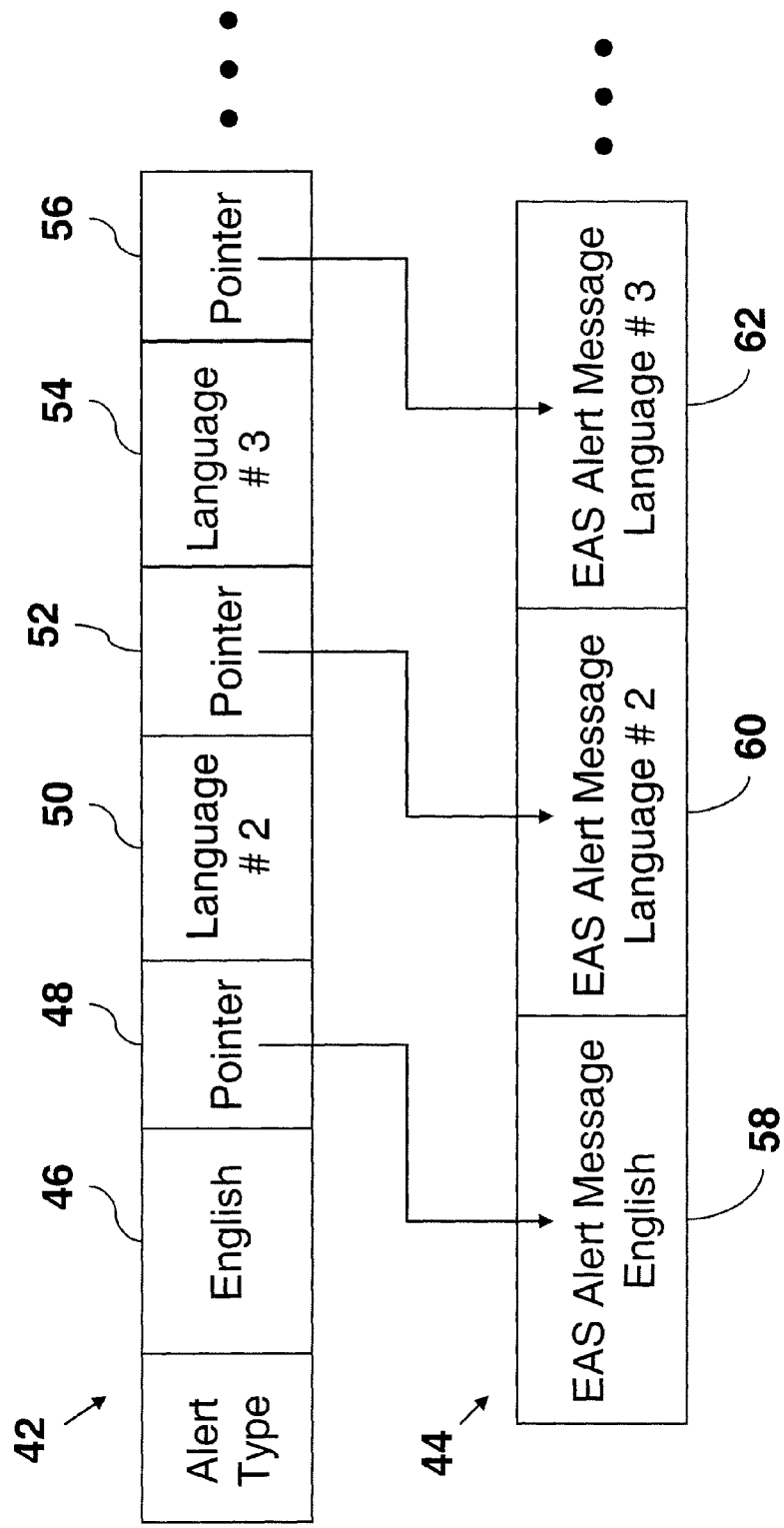
FIG. 5 depicts an example wireless EAS language vector utilized with a wireless multiple language EAS alert provided via a single channel.

In an example embodiment, if the languages supported for the wireless EAS alerts vary (e.g., based upon factors such as wireless alert source, target area of the wireless alert and wireless operator policies), the wireless EAS language vector is provided with each wireless EAS alert. Thus, the languages supported FIG. 5 depicts an example wireless EAS language vector 42 utilized with a wireless multiple language EAS alert provided via a single channel 44. Each language type portion 46, 50, 54, is indicative of a respective language. Each respective pointer portion 48, 52, 56, of the wireless EAS language vector 42 is indication of the channel 44, and optionally location therein of the EAS alert message 58, 60, 62, in the indicated language. The wireless EAS language vector 42 can be pre-provisioned in a mobile device and/or the wireless EAS language vector 42 can be provided to the mobile device via broadcast. The wireless EAS language vector 42 can be provided to the mobile device as part of the channel 44 and/or a separate channel.

Figure 6:
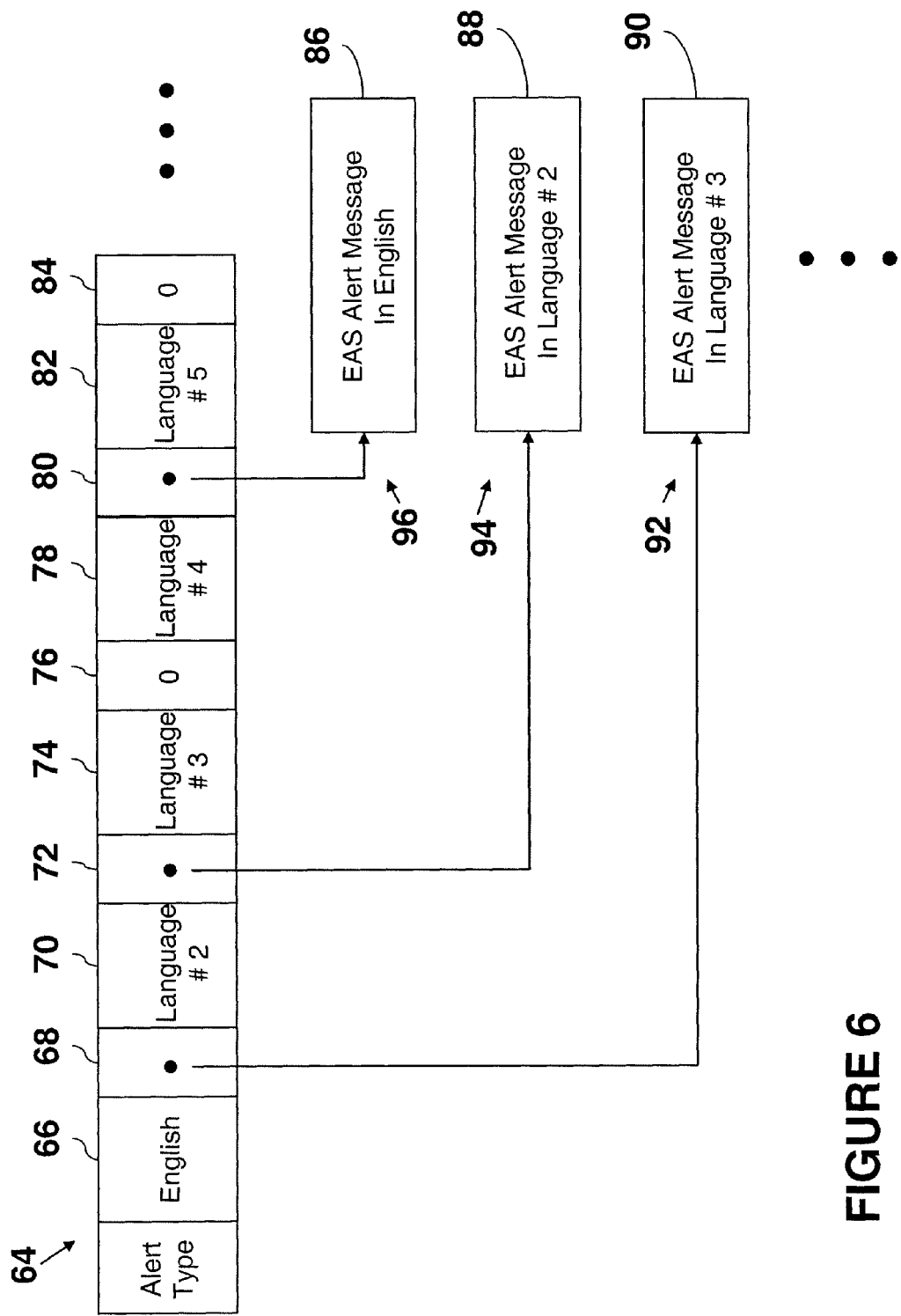
FIG. 6 depicts an example wireless EAS language vector utilized with a wireless multiple language EAS alert provided via multiple channels.

FIG. 6 depicts an example wireless EAS language vector 64 utilized with a wireless multiple language EAS alert provided via multiple channels 92, 94, 96. Each language type portion 66, 70, 74, 78, 82, is indicative of a respective language. Each respective pointer portion 68, 72, 76, 80, 84, of the wireless EAS language vector 64 is indication of a respective channel 92, 94, null, 96, null, and optional location therein of the EAS alert message 90, 88, 86, in the indicated language. The wireless EAS language vector 64 can be pre-provisioned in a mobile device and/or the wireless EAS language vector 64 can be provided to the mobile device via broadcast. The wireless EAS language vector 64 can be provided to the mobile device as part of one or more of the channels 92, 94, 96, and/or a separate channel.

Figure 7:
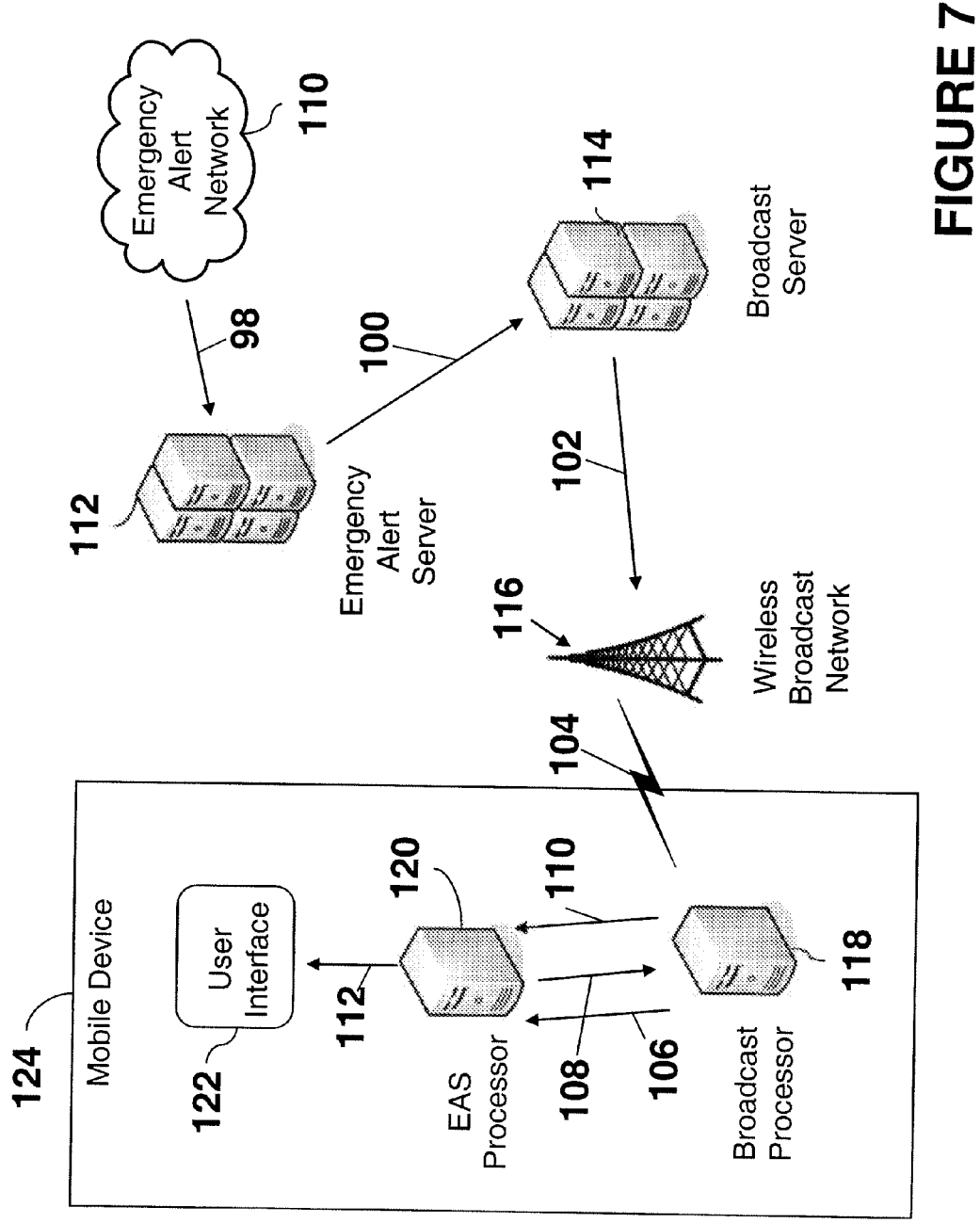
FIG. 7 is a flow diagram of an example system and process for providing multiple language EAS alert messages.

FIG. 7 is a flow diagram of an example system and process for providing multiple language EAS alert messages. An EAS alert message is generated in multiple languages and provided, at step 98, via the emergency alert network 110, to the emergency alert server 112. The emergency alert server analyzes the received multiple language EAS alert message and determines which languages are contained therein. If an EAS language vector (e.g., EAS language vector 26 in FIG. 3) is to be generated, the emergency alert server the alert type portion (e.g., portion 28 in FIG. 3) and language indicator portions (e.g., portions 30, 34, and 38 in FIG. 3) of the EAS language vector. The alert type portion of the EAS language vector is optional. That is, an EAS language vector can be generated without an alert type portion. At step 100, the multiple language EAS alert message is provided by the emergency alert server 112 to the broadcast server 114. In example embodiments, the multiple language EAS alert message provided at step 100 can comprise an EAS language vector or not comprise an EAS language vector.

The broadcast server 114, upon receipt of the multiple language EAS alert message (provided at step 100), obtains the associated channel assignments for each language of the multiple language EAS alert message. As described above, a single channel can be associated or multiple channels can be associated. The associated channel assignment(s) can be obtained from any appropriate source. For example, the associated channel assignment can be pre-provisioned in the broadcast server 114, the associated channel assignment can be obtained from a source other than the broadcast server 114 (e.g., a separate database), or a combination thereof. The broadcast server 114 incorporates the associated channel assignment into the multiple language EAS alert message and/or into the EAS language vector, if generated.

In an example embodiment, if the channel assignments obtained by the broadcast server 114 indicates a particular language is assigned to a specific channel but the received multiple language EAS alert message does not contain that language, the entry in the EAS language vector indicates that no channel is assigned (e.g., portions 76 and 84 of EAS language vector 64 in FIG. 6). For example, if the broadcast server 114 obtains an indication that the EAS alert message in French should be broadcast on channel X, and no French component was provided in the multiple language EAS alert message, the entry in the EAS language vector for French would be set to zero, null, or the like, to indicate no assigned channel.

In an example embodiment, if the multiple language EAS alert message contains a translation of the message in a language that is not obtained by the broadcast server 114, that portion of the multiple language EAS alert message for that specific language is not broadcast. For example, if the multiple language EAS alert message contains a Portuguese component but there is no channel assigned in the broadcast server 114 for emergency alerts in Portuguese, the Portuguese component of the emergency alert message is not provided by the broadcast server 114 to the wireless broadcast server 116.

At step 102, the broadcast server 114 provides the multiple language EAS alert message with the alert message in each appropriate language, and, if generated, the EAS language vector, to the wireless broadcast network 116. The wireless broadcast network 116 broadcasts to the mobile device 124, at step 104, the multiple EAS alert message. If an EAS language vector was generated (e.g., by the emergency alert server 112), the wireless broadcast network 116 inserts the EAS language vector into the broadcast of every active broadcast channel. In an example embodiment, the wireless broadcast network 116 transmits on all broadcast channels which are assigned, even if inactive. For each language with an associated translation of the EAS alert message, the EAS language vector and the associated translation of the EAS alert message are broadcast on the specified emergency alert message channel for that specific language. In an example embodiment, the wireless broadcast network repeats the above actions continuously until the emergency situation changes or dissipates.

The broadcast processor 118 of the mobile device 124 receives the multiple language EAS alert message (provided at step 104). In an example embodiment, if the broadcast processor 118 is receiving the EAS alert message on an active non-emergency alert channel and the EAS alert message contains an EAS language vector, the broadcast processor 118 extracts the EAS language vector from the received EAS alert message and provides, at step 106, the EAS language vector to the EAS processor 120 on the mobile device 124. In an example embodiment, if the broadcast processor 118 receives only the EAS language vector (e.g., the broadcast processor 118 is monitoring an idle non-emergency alert channel), the broadcast processor 118 provides, at step 106, the EAS language vector to the EAS processor 120 on the mobile device 124. In an example embodiment, it the broadcast processor is monitoring an emergency alert channel, the broadcast server 118 provides, at step 106, the received EAS language vector to the EAS processor 120 on the mobile device 124.

In an example embodiment, the language vector is provided via an emergency alert channel. Potentially this is the "primary" emergency alert channel. The broadcast processor 118 is always monitoring the "primary" emergency alert channel and receives the EAS language vector on this channel. The EAS language vector will then point the broadcast processor to the "alternate" emergency alert channels depending on the method being used. This is implementable via a single channel or multiple channels.

Using pre-provisioned subscriber preferences in the mobile device 124, the EAS processor 120 analyzes the EAS language vector to determine (1) if the emergency alert is of the type that the subscriber wishes to receive and (2) if the emergency alert message is being provided in the subscriber's preferred language. If the subscriber wishes to receive this type of alert message, the EAS processor 120 provides, at step 108, to the broadcast processor 118 an indication of which channel specified in the EAS language vector should be used for the receipt of the EAS alert message. For example, if the subscriber's preferred language is Spanish, the EAS processor 120 will instruct, at step 108, the broadcast processor 118 to obtain message from the channel associated with the Spanish language message. In an example embodiment, if the subscriber's preferred language is not contained in the EAS language vector, the EAS processor 120 provides, at step 108, a default language indication to the broadcast server 118.

Upon receipt from the EAS processor 120 of the indication of the channel containing the EAS alert message in the selected language, the broadcast processor 118 obtains the EAS alert message in the selected language and provides, at step 110, the EAS alert message in the selected language to the EAS processor. At step 112, the EAS Processor provides the received EAS alert message, in the appropriate language to the user interface 122 for rendering thereof.

The mobile device 124 is representative of any appropriate type of device that can be utilized to receive a multiple language EAS alert message, select a language specific EAS alert message from a multiple language EAS alert message, and render the selected language specific EAS alert message in the preferred language. Example mobile devices include any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television).

The mobile device 124 can comprise any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television). Example devices can comprise any appropriate mobile device, such as, for example, a portable device, a variety of computing devices including (a) a portable media player, e.g., a portable music player, such as an MP3 player, a walkmans, etc., (b) a portable computing device, such as a laptop, a personal digital assistant ("PDA"), a portable phone, such as a cell phone of the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

Each of the emergency alert server 112, the broadcast server 114, the mobile device 124, the broadcast processor 118, and the EAS processor 120 can comprise any appropriate type of processor. Example processors can be implemented in a single processor or multiple processors. Multiple processors can be distributed or centrally located. Multiple processors can communicate wirelessly, via hard wire, or a combination thereof. Examples processors include mobile communications devices, mobile telephones, personal digital assistants (PDAs), lap top computers, handheld processors, or a combination thereof. The EAS processor 120 and the broadcast processor 118 can be implemented as a single processor, separate processors, distributed processors, or a combination thereof. The emergency alert server 112 and the broadcast server 114 can be implemented as a single processor, separate processors, distributed processors, or a combination thereof.

The following description sets forth some exemplary telephony radio networks and non-limiting operating environments for broadcasting secure messages. The below-described operating environments should be considered non-exhaustive, however, and thus the below-described network architectures merely show how multi-language EAS alert messages may be incorporated into existing network structures and architectures. It can be appreciated, however, that multi-language EAS alert messages can be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of multi-language EAS alert messages can be applied independently of the method for data transport, and do not depend on any particular network architecture, or underlying protocols.

Figure 8:
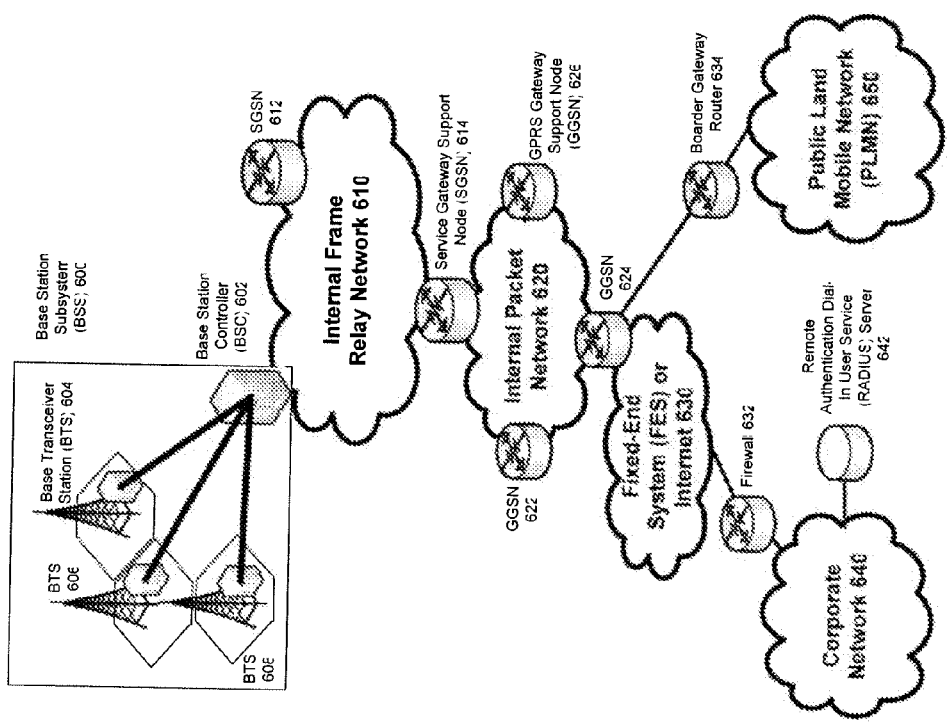
FIG. 8 depicts an overall block diagram of an exemplary packet-based mobile cellular network environment, such as a GPRS network, in which the system for implementing a multiple language EAS alert message can be practiced.

FIG. 8 depicts an overall block diagram of an exemplary packet-based mobile cellular network environment, such as a GPRS network, in which the system for implementing a multiple language EAS alert message can be practiced. In an example configuration, the emergency alert network 110 and/or the wireless broadcast network 116 are encompassed by the network environment depicted in FIG. 8. In such an environment, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices (e.g., portable device 38) become connected to the wireless network. In exemplary fashion, the packet traffic originating from user devices (e.g., user device 80) is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 9:
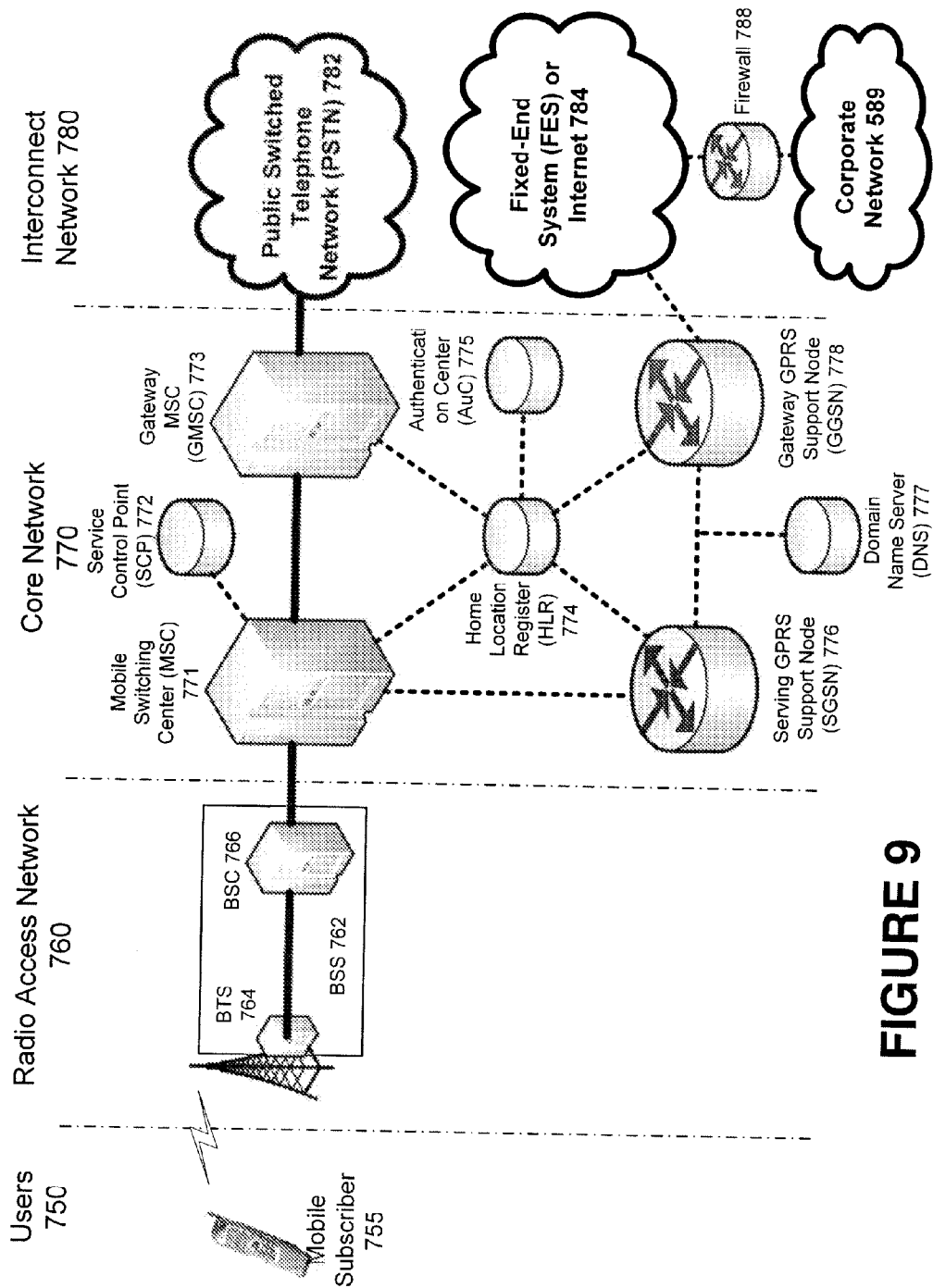
FIG. 9 illustrates an architecture of a typical GPRS network as segmented into four groups.

FIG. 9 illustrates an architecture of a typical GPRS network as segmented into four groups: users 950, radio access network 960, core network 970, and interconnect network 980. In an example configuration the emergency alert network 110, and the wireless broadcast network 116 are encompassed by the radio access network 960, core network 970, and interconnect network 980. Users 950 comprise a plurality of end users (though only mobile subscriber 955 is shown in FIG. 9). In an example embodiment, the device depicted as mobile subscriber 955 comprises portable device 38. Radio access network 960 comprises a plurality of base station subsystems such as BSSs 962, which include BTSs 964 and BSCs 966. Core network 970 comprises a host of various network elements. As illustrated here, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 9, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the mobile device 124, used by an end user of the mobile cellular service. When a mobile subscriber turns on his or her mobile device, the mobile device goes through an attach process by which the mobile device attaches to an SGSN of the GPRS network. In FIG. 9, when mobile subscriber 955 initiates the attach process by turning on the network capabilities of the mobile device, an attach request is sent by mobile subscriber 955 to SGSN 976. The SGSN 976 queries another SGSN, to which mobile subscriber 955 was attached before, for the identity of mobile subscriber 955. Upon receiving the identity of mobile subscriber 955 from the other SGSN, SGSN 976 requests more information from mobile subscriber 955. This information is used to authenticate mobile subscriber 955 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 955 was attached before, to cancel the location process for mobile subscriber 955. HLR 974 then notifies SGSN 976 that the location update has been performed. At this time, SGSN 976 sends an Attach Accept message to mobile subscriber 955, which in turn sends an Attach Complete message to SGSN 976.

After attaching itself with the network, mobile subscriber 955 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 955. The mobile subscriber 955 uses an algorithm to send the user identification (ID) and password to SGSN 976. The SGSN 976 uses the same algorithm and compares the result. If a match occurs, SGSN 976 authenticates mobile subscriber 955.

Next, the mobile subscriber 955 establishes a user session with the destination network, corporate network 989, by going through a Packet Data Protocol ("PDP") activation process. Briefly, in the process, mobile subscriber 955 requests access to the Access Point Name ("APN"), for example, UPS.com (e.g., which can be corporate network 989 in FIG. 9) and SGSN 976 receives the activation request from mobile subscriber 955. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 955.

Once activated, data packets of the call made by mobile subscriber 955 can then go through radio access network 960, core network 970, and interconnect network 980, in a particular fixed-end system or Internet 984 and firewall 988, to reach corporate network 989.

Thus, network elements that can invoke the functionality of a multiple language EAS alert message can include but are not limited to Gateway GPRS Support Node tables, Fixed End System router tables, firewall systems, VPN tunnels, and any number of other network elements as required by the particular digital network.

Figure 10:
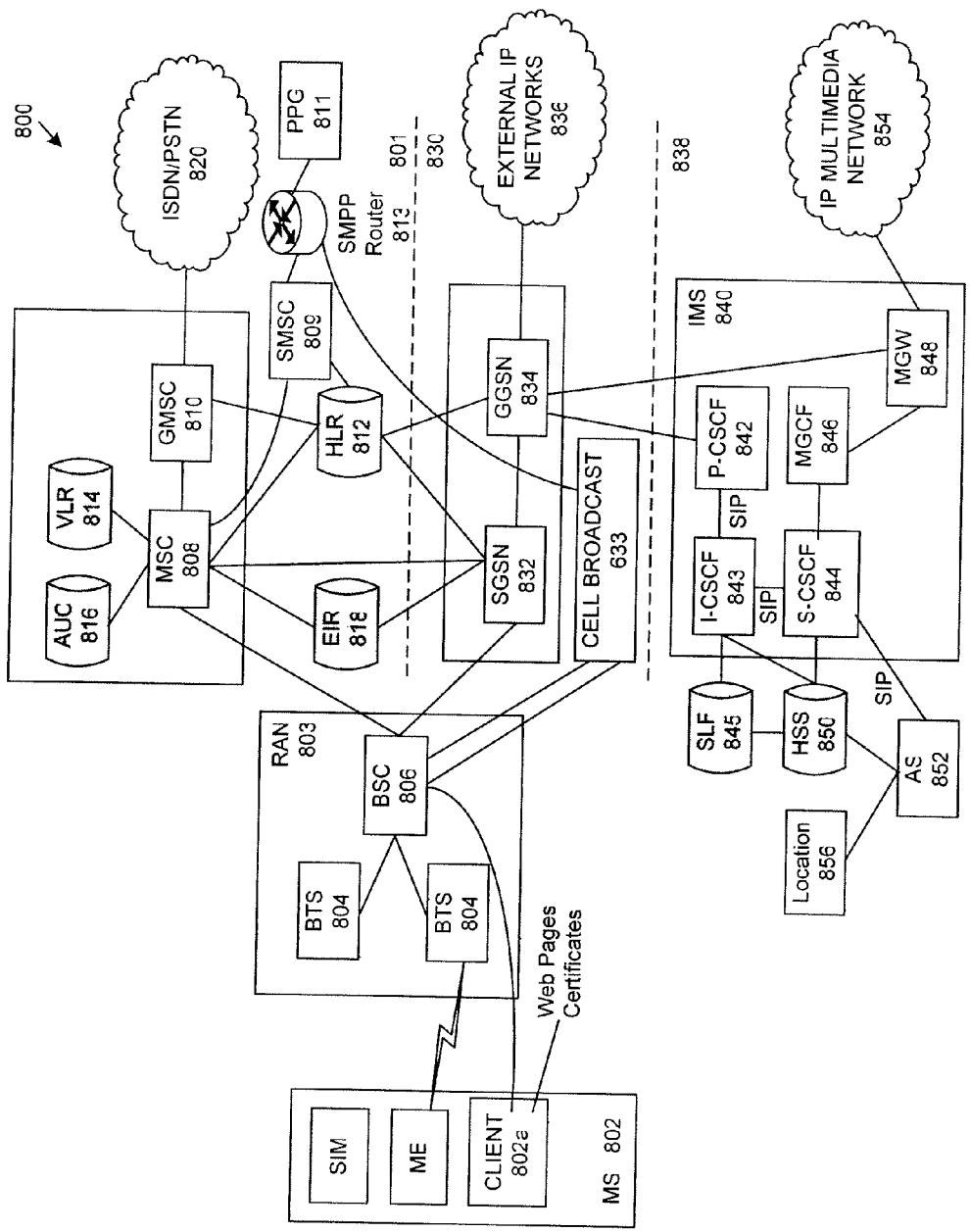
FIG. 10 illustrates an example alternate block diagram of an exemplary GSM/GPRS/IP multimedia network architecture in which a multiple language EAS alert messages can be incorporated.

FIG. 10 illustrates another exemplary block diagram view of a GSM/GPRS/IP multimedia network architecture 1000 in which a multiple language EAS alert message can be incorporated. As illustrated, architecture 1000 of FIG. 10 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer (e.g., portable device 38) that is used by mobile subscribers, with a Subscriber identity Module (SIM). The SIM includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 1033 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of a multiple language EAS alert message have been described in connection with various computing devices, the underlying concepts can be applied to any computing device or system capable of a multiple language EAS alert message. The various techniques described herein can be implemented in connection with hardware or software or, where appropriate, with a combination of both. Thus, the methods and apparatus for a multiple language EAS alert message, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing a multiple language EAS alert message. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for a multiple language EAS alert message also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for a multiple language EAS alert message. When implemented on a general-purpose processor, the program code combines with the processor to provide a unique apparatus that operates to invoke the functionality of a multiple language EAS alert message. Additionally, any storage techniques used in connection with a multiple language EAS alert message can invariably be a combination of hardware and software.

While a multiple language EAS alert message has been described in connection with the various embodiments of the various figures, it is to be understood that other similar embodiments can be used or modifications and additions can be made to the described embodiment for performing the same function of a multiple language EAS alert message without deviating therefrom. For example, one skilled in the art will recognize that a system for a multiple language EAS alert message as described may apply to any environment, whether wired or wireless, and may be applied to any number of devices connected via a communications network and interacting across the network. Therefore, a multiple language EAS alert message should not be limited to any single embodiment, but rather should be construed in breadth and scope in accordance with the appended claims.

What is claimed is:

1. A method comprising:
   receiving a multiple language message including a plurality of messages, each message of the plurality of messages being in a different language;
   analyzing the multiple language message to determine a respective language of each message of the plurality of messages;
   generating a language vector based on the analysis of the multiple language message, the language vector comprising:
   a plurality of language indicators, each language indicator denoting the respective determined language of a corresponding one of the plurality of messages; and
   a plurality of location indicators, each location indicator associated with a respective one of the plurality of language indicators, wherein each location indicator denotes a location of a corresponding one of the plurality of messages;

broadcasting a wireless emergency alert system alert message in a default language, the wireless emergency alert system alert message comprising the language vector; and subsequent from the previously broadcasted wireless emergency alert system alert message comprising the language vector, broadcasting the multiple language message based on a preferred language associated with a mobile device.

2. A method in accordance with claim 1, further comprising selecting a single channel for broadcasting the multiple language message.

3. A method in accordance with claim 2, wherein the plurality of messages is interleaved in the single channel.

4. A method in accordance with claim 3, wherein each location indicator denotes a respective location of a corresponding one of the plurality of messages within the single channel.

5. A method in accordance with claim 1, further comprising selecting a plurality of channels for broadcasting the multiple language message, wherein the step of broadcasting the multiple language message comprises broadcasting each of the plurality of messages via a respective one of the plurality of channels.

6. A method in accordance with claim 5, wherein each location indicator denotes a respective one of the plurality of channels that carries a corresponding one of the plurality of messages.

7. A method in accordance with claim 1, wherein the language vector further comprises an indication of message type.

8. A server comprising:
a processor; and
a memory coupled to the processor, the memory having stored thereon executable instructions that when executed by the processor cause the processor to effectuate operations comprising:
receive a multiple language message including a plurality of messages, each message of the plurality of messages being in a different language;
analyze the multiple language message to determine a respective language of each message of the plurality of messages;
generate a language vector based on the analysis of the multiple language message, the language vector comprising:
a plurality of language indicators, each language indicator denoting the respective determined language of a corresponding one of the plurality of messages; and
a plurality of location indicators, each location indicator associated with a respective one of the plurality of language indicators, wherein each location indicator denotes a location of a corresponding one of the plurality of messages;
broadcasting a wireless emergency alert system alert message in a default language, the wireless emergency alert system alert message comprising the language vector; and
subsequent from the previously broadcasted wireless emergency alert system alert message comprising the language vector, broadcasting the multiple language message based on the preferred language associated with a mobile device.

9. A server in accordance with claim 8, further configured to designate a single channel for broadcasting the multiple language message.

10. A server in accordance with claim 9, wherein the plurality of language messages is interleaved in the designated single channel.

11. A server in accordance with claim 10, wherein each location indicator denotes a respective location of a corresponding one of the plurality of messages within the single channel.

12. A server in accordance with claim 8, further configured to designate a plurality of channels for broadcasting the multiple language message, wherein each language specific message is designated for broadcast via a respective one of the plurality of channels.

13. A server in accordance with claim 12, wherein each location indicator denotes a respective one of the plurality channels that carries a corresponding one of the plurality of messages.

14. A server in accordance with claim 8, wherein the language vector further comprises an indication of message type.

15. A server in accordance with claim 8, wherein the multiple language message comprises an Emergency Alert System alert message.

16. A mobile device comprising:
a processor; and
a memory coupled to the processor, the memory having stored thereon executable instructions that when executed by the processor cause the processor to effectuate operations comprising:
receive a first transmission comprising a wireless emergency alert system alert message in a default language, the wireless emergency alert system alert message comprising a language vector associated with a multiple language message;
receive, subsequent to receipt of the first transmission, based on a preferred rendering language associated with the mobile device, a second transmission that is separate from the first transmission, the second transmission comprising the multiple language message, the multiple language message including a plurality of messages, each message of the plurality of messages being in a different language;
retrieve the preferred rendering language for the mobile device;
determine, utilizing the language vector, a location of a preferred message of the plurality of messages, wherein the preferred message comprises a message in a particular language that corresponds to the preferred rendering language;
retrieve the preferred message from the determined location; and
render the preferred message on the mobile device.

17. A mobile device in accordance with claim 16, wherein the multiple language message is received via broadcast over a single channel, the plurality of language messages interleaved in the single channel.

18. A mobile device in accordance with claim 16, wherein the multiple language message is received via broadcast over a plurality of channels, each message of the plurality of messages broadcast via a respective one of the plurality of channels.

19. A mobile device in accordance with claim 16, wherein the language vector comprises:
a plurality of language indicators, each language indicator denoting a respective particular language of a corresponding one of the language specific messages; and a plurality of location indicators, each location indicator associated with a respective one of the plurality of language indicators, wherein each location indicator denotes a location of a corresponding one of the plurality of messages.

* * * * *

UNITED STATES PATENT AND TRADEMARK OFFICE
CERTIFICATE OF CORRECTION

Page 1 of 1

PATENT NO. : 8,832,731 B1
APPLICATION NO. : 11/695843
DATED : September 9, 2014
INVENTOR(S) : DeWayne Allan Sennett and Brian Kevin Daly It is certified that error appears in the above-identified patent and that said Letters Patent is hereby corrected as shown below:

In the claims

Column 15,
Claim 8, line 66, delete "the preferred" and insert -- a preferred --.

Signed and Sealed this
Fifth Day of April, 2016

Michelle K. Lee
*Director of the United States Patent and Trademark Office*